INVENTORS
RAYMOND GROCE
ARNOLD J. EISENBERG
WINTON S. LOVELAND
SAUL WARSHAW

BY Curtis, Morris & Safford

ATTORNEYS

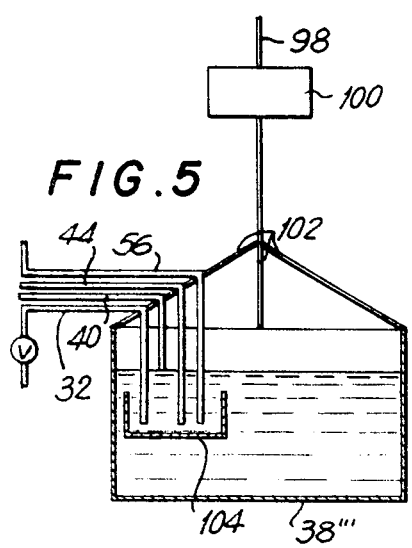
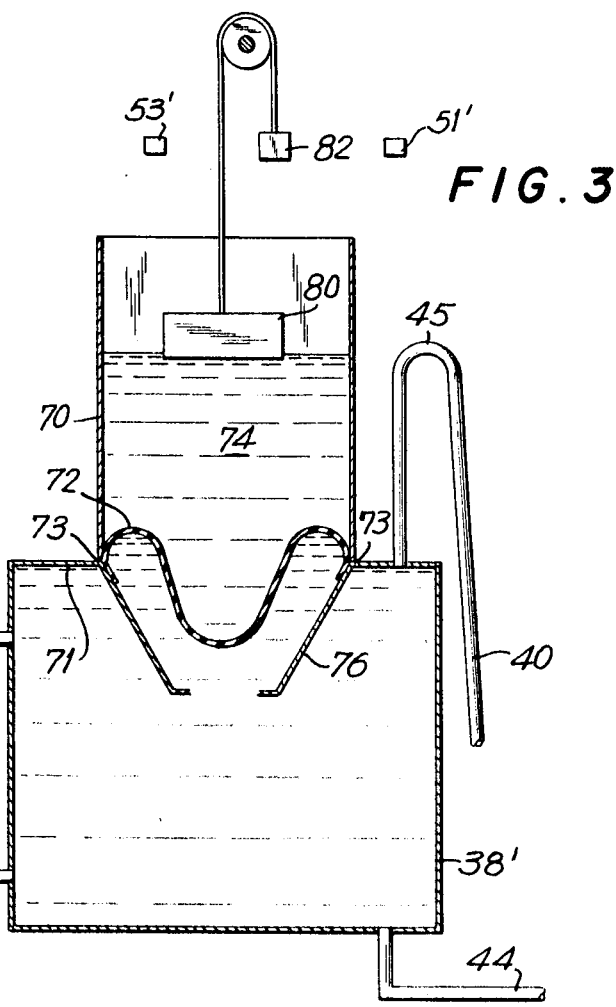
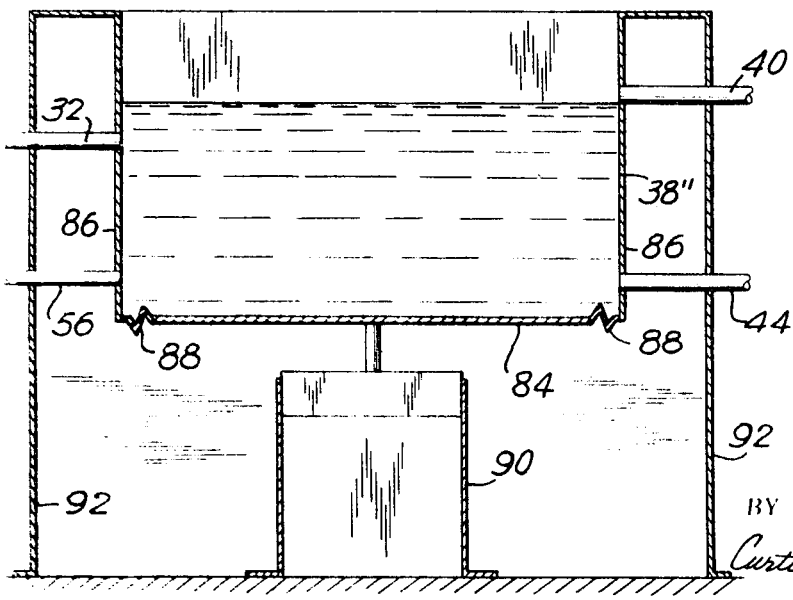
INVENTORS
RAYMOND GROCE
ARNOLD J. EISENBERG
WINTON S. LOVELAND
SAUL WARSHAW

United States Patent Office 3,605,682
Patented Sept. 20, 1971

3,605,682
COATING COMPUTER
Raymond Groce, Mamaroneck, Arnold J. Eisenberg, East Setauket, Winton S. Loveland, Fort Salonga, and Saul Warshaw, New York, N.Y., assignors to The Loveshaw Corporation, Farmingdale, N.Y.
Filed June 23, 1969, Ser. No. 835,368
Int. Cl. B05c 11/10
U.S. Cl. 118—7
12 Claims

ABSTRACT OF THE DISCLOSURE

A coating computer which may be used with apparatus for applying a coating material to a continuous moving substrate to determine the quantity of coating material applied to the substrate per unit area of the substrate. The computer utilizes an intermediate or buffering tank to meter coating material to the coating station and the change in coating material level in the metering tank is determined for a fixed area of substrate by digital read out means to correlate the quantity of coating material applied per unit area of substrate.

---

The present invention relates to coating computers and more particularly to coating computers to measure the quantity of a coating material applied to a continuously moving substrate.

A coating computer in accordance with this invention is used advantageously with apparatus for applying a liquid to a continuously advancing strip. An example of such apparatus is shown in Warshaw et al. U.S. Patent 3,172,779 which patent discloses an apparatus for computing the amount of liquid applied to a continuously moving strip, or substrate, per unit area of strip. In this Warshaw et al. device, which obviated many problems encountered in prior art coating computers, a measurement is made of the amount of liquid applied to the strip and this measurement then is compared with the area of the strip that is coated and a determination is made of the amount of liquid applied per unit area of the strip.

It has been found, however, that for greater accuracy in computation it is desirable that the quantity of liquid measured during the coating computation is in fact the precise quantity which is applied to the strip because problems in making computations often arise when a quantity of liquid which is stored in, or which is in the process of flowing to, the coating apparatus is not accounted for in the computation. Problems also arise when liquid which has been accounted for in the coating computation and pumped to the coating apparatus is not applied to the substrate.

Accordingly, an object of the present invention is to provide a coating computer in which the amount of liquid which is measured gives an accurate determination of that amount of liquid which is in fact applied to the substrate.

Another object of the present invention is to provide a simplified, extremely-accurate coating computer for measuring the quantity of coating applied to a substrate.

Still another object of the present invention is to provide a coating computer for use with liquid coating apparatus wherein the liquid level in the supply reservoir is maintained at a constant level without the need for complex level controls.

The foregoing and other objects and advantages are satisfied in accordance with the present invention by providing an intermediate metering or buffer tank in the liquid feed system of a coating apparatus. Computations of the coating thickness are made intermittently, and, when no computations are being made, the liquid coating material is continuously fed to the buffer tank and then to the coating station. During periods of computations, the supply of liquid to the buffer tank is cut off and, hence, only liquid from the buffer tank is fed to the coating station. The change in liquid level in the buffer tank thus provides an accurate and easily determined measure of the precise quantity of liquid which was applied to the substrate during the computation period.

Other objects and advantages of the present invention will be made apparent in the following description and drawing wherein:

FIGS. 3 and 5 are diagrammatic views, in side elevation, of other embodiments of buffer tanks which can be used in the coating computer of the present invention.

Figure 1:
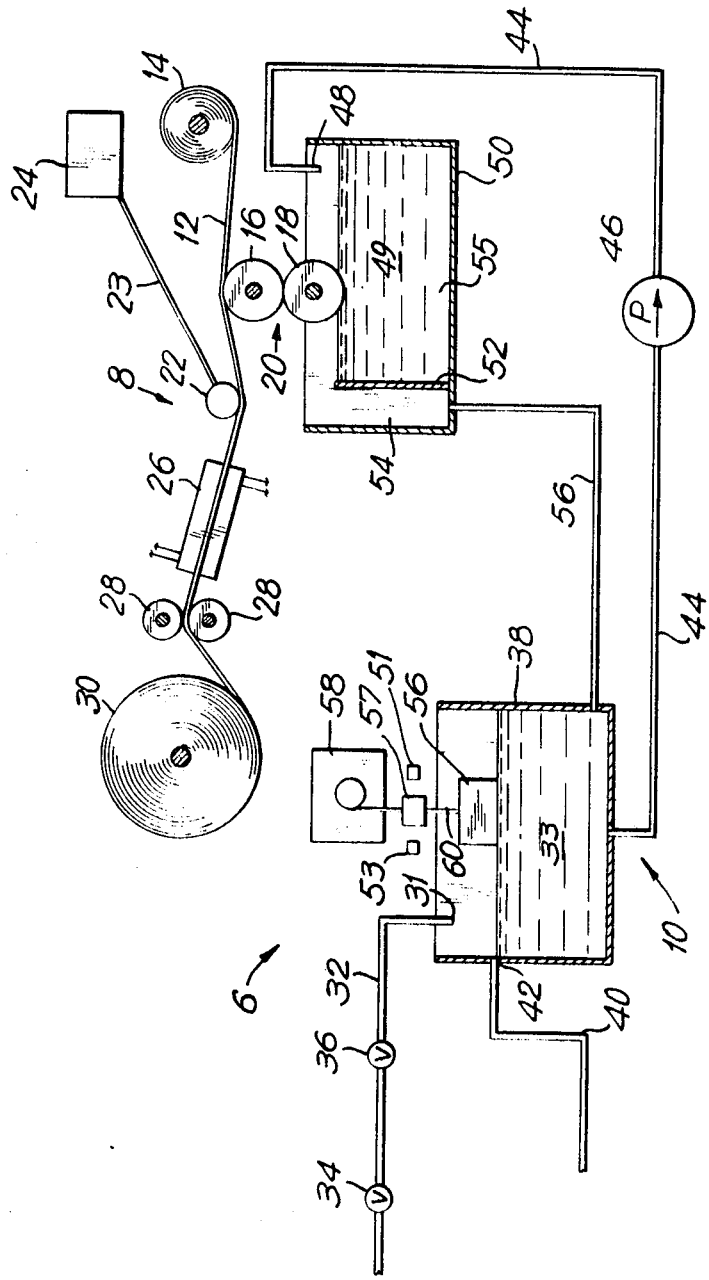
FIG. 1 is a diagrammatical representation of an apparatus for applying a liquid coating to a continuously advancing substrate showing a preferred embodiment of the intermediate buffer tank according to the present invention.

Referring now to FIG. 1, a system 6 for supplying and coating liquid on a continuously advancing substrate and for computing the quantity of liquid coated on the substrate per unit area of the substrate is diagrammatically shown. System 6 includes a substrate, or strip, drive assembly 8 for advancing the substrate continuously and a liquid supply system 10 to supply liquid for application to the advancing substrate.

With specific reference to the strip drive assembly 8, there is shown a substrate 12, for example a continuous strip of tape or the like, which is drawn from a supply roll 14 over an application station 20 which includes an applicator roller 16 and a doctor, or pickup, roller 18. After the application station 20, the strip 12 is drawn beneath a roller 22 of a linear digital footage transducer 24 having a suitable counter to record the length of strip passing beneath roller 22, then through a drying oven 26 (included when the coating material is an adhesive or other material requiring drying), through opposed drive rollers 28 and on to a rewind roll 30. When strip 12 moves through assembly 8, roller 22, in contact with the strip, is rotated and sends a train of pulses to transducer 24 by line 23. When transducer 24 is activated during a computation cycle the pulses are recorded and are a measure of the length of the strip passing beneath roller 22.

Liquid supply system 10 includes a fluid feed line 32 having a manual valve 34 and a normally-opened solenoid valve 36 therein. Line 32 terminates at a feed orifice 31 which feeds the liquid 33 into an intermediate metering or buffer tank 38. A fluid return line 40, connected at 42 to the tank 38, returns the overflow liquid, i.e., liquid in the tank above the junction 42, back to the pipe 32 or, if desired, back to the original supply source of the liquid (not shown). The change in liquid level in tank 38 is recorded by a digital level transducer 58 having a float 56 adapted to float on the surface of liquid 33 in tank 38 and connected to the transducer by line 60. The digital level transducer 58, which may be a shaft encoder, linear encoder, or a like device, sends a series of pulses as the level in the metering tank 38 changes. Each pulse is proportional to a fixed increment of change in the liquid level in tank 38 and can be proportioned to obtain a reading in any desired engineering units.

The liquid 33 in tank 38 is drawn from the tank through a line 44 connected at the bottom of tank 38 and pumped by a pump 46 therein to a feed orifice 48 which empties into the liquid into the reservoir 50. Reservoir 50 is provided with a weir, or standpipe 52, which, along with portions of the side walls and bottom of tank 50, defines two chambers 54 and 55 therein. Thus, liquid exiting from orifice 48 flows into chamber 55 and, when operating in overflow condition, liquid from chamber 55 flows over weir 52 into chamber 54. A line 56, connected at one end to the bottom of chamber 54 and at its other end to the bottom of buffer tank 38, returns liquid which overflows from chamber 54 back to tank 38. Reservoir 50 is elevated with respect to tank 38 so that the return of liquid from chamber 54 is by gravity feed.

During normal operation, i.e., when no coating computation is being made, liquid is fed to buffer tank 38 from a supply source (not shown) through line 32. Manual valve 34 is adjusted for the desired liquid flow rate. Solenoid operated valve 36 is maintained in its normally open state and liquid accumulates in buffering tank 38 up to a fixed level determined by the position of overflow line 42. Liquid is pumped from buffer tank 38 and this flow rate is adjusted by adjusting the pump rate of pump 46 to maintain a desired rate of liquid flow into chamber 55 of reservoir 50. A quantiy of liquid 49 is collected in chamber 55 and then overflows weir 52 into chamber 54 and returns to buffer tank 38. The pump rate of pump 46 is adjusted so that there is a slight overflow of liquid from chamber 55 at all times.

Liquid from chamber 55 is applied to the advancing strip at the application station 20 by positioning pickup roll 18 so that it dips into the liquid supply 49. Liquid adheres to the surface of roll 18 and, as roll 18 rotates, a portion of the adhering liquid is transferred to the surface of applicator roll 16. As applicator roll 16 rotates, the liquid is transferred or coated onto the advancing strip 12. The thickness of the coating applied to the strip can be varied by changing the spacing between the applicator roll and the pickup roll 18.

When a computation of the quantity of liquid applied per unit area of the advancing strip is to be made, the solenoid controlled valve 36 in feed line 32 is closed preventing additional liquid from entering tank 38. Thus, any liquid applied as a coating to strip 12 during the computation cycle must be drawn from liquid in the system, i.e., from liquid in tank 38, reservoir 50 or in transit between the two. As a consequence, the level of liquid in buffer tank 38 begins to fall because fluid is continuously pumped from metering tank 38 into reservoir 50 to replace liquid which has been applied to the advancing strip. The constant overflow over weir 52 is maintained and some liquid is returned to buffer tank 38 as before. However, more fluid leaves metering tank 38 through pipe 44 than is returned through pipe 56 and the level of liquid in chamber 55 of reservoir 50 is maintained at the height of weir 52. Hence, the change in the level of the liquid in the buffer tank 38 represents the precise quantity of liquid being applied to the strip 12 during the computation cycle.

After the level in tank 38 falls below the overflow 42 as sensed by a photocell 51 and light 53 across a flag 57 on the float cable the computation cycle beings, and pulses from the digital footage transducer 24 are gated to a counter (not shown) which has been preset to a given number, and at the same instant, pulses from the digital level transudcer 58 are gated to a second counter (also not shown). When the preset number on the counter of the digital footage transducer is reached, both counters are stopped and the valve 36 is opened automatically to refill the tank 38 and normal operations are resumed.

The preset number to which the digital footage counter 24 is set is selected after considering the width of the strip and the percentage of solids of the coating liquid. Hence, a definite base area has been measured off during the computation period. The numbers on the counter for the digital level transducer 58 are selected to indicate in proper engineering units the coating thickness or weight applied to the known base area of strip coated during the computation cycle. Since the cross section area of the buffer tank 38 is known and the change in liquid level in buffer tank 38 is known from the summation of the pulses from the digital level transducer 58 this results in a determination of the volume of liquid applied to the strip and, since the area of the strip coated and the percent solids has also been determined, an average coating thickness or weight can also be determined.

Figure 2:
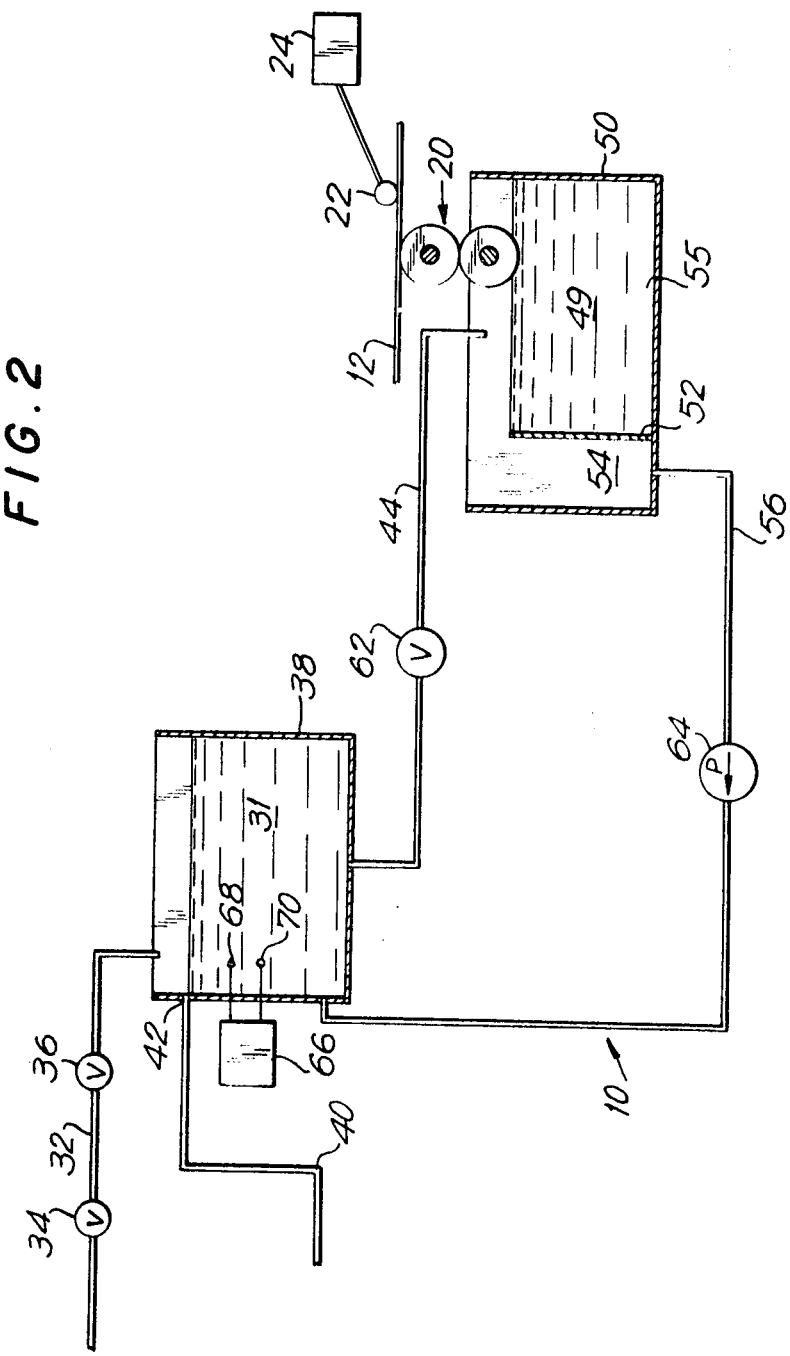
FIG. 2 is a diagrammatic representation of another embodiment of the present invention.

In FIG. 2, an alternate embodiment of a coating computer constructed in accordance with the teachings of the present invention is shown. In this embodiment metering tank 38 is oriented above reservoir 50 to provide for a gravity flow of liquid from buffer 38 and the rate of flow is adjusted by a manually operable valve 62 in line 44. Liquid overflowing into chamber 54 of tank 50 is returned to the bottom of the metering tank 38 by a pump 64 in overflow line 56. A dual level signal transducer 66 having individually adjustable sensors 68 and 70 is used to determine the change in level of the liquid in buffer tank 38. Transducer 66 produces either an electrical or mechanical signal when the level fluid passes either sensor 68 or 70.

Accordingly, when this system operates under normal conditions, i.e., when no reading is being made, liquid enters tank 38 through feed line 32 and the open valves 34 and 36 as in the embodiment of FIG. 1, manual valve 34 is set to provide a desired flow rate and a maximum level of fluid in buffer tank 38 is maintained by overflow pipe 40. The liquid entering pipe 40 is returned to the supply source, or is otherwise recirculated. The rate of flow of liquid through pipe 44 is controlled by manual valve 62 which is adjusted to provide for the desired flow rate of liquid into chamber 55 of reservoir 50. Ideally, this flow rate is adjusted so that there will be a slight overflow into chamber 54 and this overflow is returned to tank 38 from chamber 54 through line 56 by constant rate pump 64.

When a computation is to be made, solenoid valve 36 is closed to prevent further liquid from entering buffer tank 38. The level of fluid in the buffer tank begins to fall and, as in the other embodiments the change of the liquid level in tank 38 represents the quantity of liquid applied to strip 12 during the computation cycle. In this embodiment, the change in liquid level in tank 38 is determined by the sensors and sensors 68 and 70 spaced accordingly. When the level of liquid reaches the upper sensor 68 the computing cycle begins and this time pulses from the digital footage transducer 24 are gated to a counter. The pulses to transducer 24 are counted until the liquid reaches the level of the lower sensor 70. This ends the computation cycle and the valve 36 is opened automatically.

The coating weight or coating thickness on the strip, i.e., the quantity of liquid applied per unit area of strip, is inversely proportional to the linear footage to which a quantity of liquid is applied. Because the change in volume between the two levels is a known quantity and because the linear footage is given by the number of pulses gated to the counter by transducer 24, the coating thickness can be computed by a suitable calculation, i.e., by dividing the known quantity of liquid, by the number of pulses gated to the counter with a suitable constant for width, percent solids, and proportionality and by providing suitable equipment for a direct read out. Accordingly, when the counter is halted at the termination of the computation cycle, the coating per unit area of the advancing strip is readily obtained.

With reference now to both FIGS. 1 and 2, it should be understood, of course, that instead of controlling the level of fluid in the tanks 38 or 50 by overflow lines 40 and 56, the level of fluid could be controlled by valves in pipes 32 or 44 which are modulated, i.e. controlled, by the level of fluid in the metering tank. A float controlled valve such as is intended is shown in the Warshaw et al. patent cited herein, and such disclosure is incorporated herein by reference. When such a valve (or valves) are employed, the apparatus for supplying liquid sometimes conveniently is referred to as a "dead-end system."

With reference now to FIG. 3, an alternative embodiment for the buffer tank 38' is shown. Tank 38' has an upper-neck section 70 which projects from an annular top 71 of the main section of tank 38', and which is connected thereto at junction 73. A rolling flexible diaphragm 72 which extends into the main tank section is connected at junction 73 and separates the neck section 70 from the main tank to form two separate chambers. A metal cone 76, also attached at junction 73, is provided to deflect air and foam from the area in main section of tank 38' beneath diaphragm 72. A digital level transducer 78, similar to the digital transducer shown in FIG. 1, having a float 80 disposed in the neck section 70 and a counterweight 82 associated therewith is also provided. The neck section 70 contains a liquid 74 which will not collect or build up deposits on the walls of the tank or on the float. Accordingly, the cross-sectional area of the neck always remains unchanged thus eliminating the error which would be introduced if liquid deposits build up on the float or on the side walls. Connected to the main section of tank 38' are a line 32 having a solenoid operated valve 36 and a manual valve (not shown), an overflow return line 40 to return overflow liquid to the supply source or to otherwise recirculate the overflow, a line 44 for supplying liquid to the liquid coating reservoir (not shown) and a line 56 for returning overflow liquid from the coating reservoir. Line 40 is upstanding from annular top 71 and has a U-shaped bend 45 therein.

During normal operations, the level of liquid in neck 70 will be approximately level with the top of the U-section 45 in line 40. The flow of liquid into and out of tank 38' during normal operations is the same as described in connection with the embodiments of FIG. 1 or 2.

During a computation cycle, valve 36 is closed and liquid is drawn through pipe 44 to the coating liquid reservoir as described previously, and no liquid leaves tank 38' through overflow line 40. As the level of liquid in tank 38' decreases, the liquid held by diaphragm 72 in the neck section 70 falls in proportion to the quantity of liquid drawn out of the main tank section. This is so because the diaphragm, due to the action of atmospheric pressure and gravity, falls into the void created in the main tank section. Accordingly, the change in the level of fluid in the neck 70 at the beginning and end of a computation cycle is proportional to the quantity of fluid drawn from tank 38' and can be used to indicate the amount of liquid applied to the strip during the computation cycle. It should be noted that the photocell 51' and the light 53' across the counterweight 52 will signal when the level of fluid, and, hence, float 80, in tank 38 falls below the level of the top of the U-section 45 in overflow return line 40.

One advantage in using the buffer tank shown in FIG. 3, is that the neck section can be filled with clean liquid which never enters the flow system thus avoiding the necessity of placing the float 80 directly into the liquid used as the coating liquid which may be an adhesive or the like. Also, the clean liquid will not collect or build up deposits on walls of the tanks or on the float 80. Thus, greater accuracy is assured in that the error introduced when the coating liquid builds up on the float and on the side walls of the container is eliminated.

It should be understood that a piston could be used instead of the diaphragm shown and, if the liquids used are of different densities and immiscible, a diaphragm or piston would not be needed at all.

Additionally, with the embodiments of FIGS. 1 and 2, the float and/or sensors are directly exposed to the rise and fall of liquid in buffer tank 38. This liquid is subject to agitation and turbulence and, hence, lateral forces are imparted to the measuring implement which may affect the accuracy of the reading of the transducer. With the embodiment of FIG. 3, all dynamic factors are eliminated, hence, only the static volumeric change in liquid level is read by the transducer.

FIG. 4 shows an alternate embodiment of the buffer tank which determines the difference in the quantity of liquid gravimetrically. This tank 38" has lines 32, 40, 44 and 56 which are similar to, and perform the same functions as, the like numbered lines in the other figures. Tank 38" has a floating bottom 84 which is connected to its sidewall 86 by a flexible diaphragm 88. The sidewalls 86 of tank 38" are supported by supports 92 and the bottom 84 is independently supported on a scale 90. Scale 90 may be a force balance scale, a load-cell scale or a similar device which requires a relatively small movement of the bottom 84 to register a reading thereon. With such an arrangement, diaphragm 88 does not contribute any significant resistance, or introduce any error.

The normal operation of a liquid supply system using this measuring tank is the same as described above. When a calculation is being made the change in weight, as indicated by the scale, is used to indicate the quantity of liquid applied to the advancing strip. The actual weight measured by the scale is a fixed percentage and is proportional to the ratio of the bottom plate area to the total cross-sectional area of the tank.

An advantage of this tank 38" is that the tare weight of the tank is supported independently and does not affect the weight, or accuracy, of the weighing of the contents. Furthermore, the effect of dynamic forces is eliminated, because any reaction on the tank walls due to static loads or dynamic forces because of pumping, or otherwise, are absorbed by the tank sides and do not affect the weighing.

FIG. 5 shows another embodiment of a buffer tank which determines the difference in the quantity of liquid gravimetrically. This tank 38''' is supported through cables 102 by a hanging support 98 having a load cell, or scale 100 connected therein, which load cell gravimetrically determines the difference in quantity of liquid in tank 38'''. The tank has lines 32, 40, 44 and 56 which are similar to, and perform the same functions as the like numbered lines in the other figures. In this embodiment a baffle structure 104 which is independently supported in the tank by pipes (not shown) surrounds the feed or input ends of the respective lines 32, 40, 44 and 56. This baffle structure minimizes the effect of dynamic forces in the tank by absorbing reactions therein due to static loads or dynamic forces caused by agitation and turbulence by pumping, or otherwise, and, hence, minimizes measurement errors. A tank similar to tank 38''', advantageously may be used for solids in the form of pellets, powders, or the like, such as is used in plastic extrusion coaters.

It should be appreciated, of course, that a digital level transducer such as the one shown in FIG. 1 could be provided for use with the conduit apparatus shown in FIG. 2, and vice versa, without departing from the invention and such alternate arrangements are intended to be a part of this invention. Also, it should be understood that if desired, during normal operations, the fluid overflow from the supply reservoir 50 could be recirculated to the supply source instead of to the buffer tank. In this case, the overflow would be diverted to the buffer tank by use of suitable branch lines and solenoid valves only during a computation cycle.

It should be understood, of course, that when used herein, the terms "strip" or "substrate" means a material which may be of linear continuous character of a flexible nature whether in web or strand form or discontinuous sheets such as plywood. Likewise, the coating liquid referred to herein need not necessarily be a liquid, but can be any coating material, including solids. The coating used will vary dependent upon the substrate and ultimate desired product.

The digital footage transducers and digital level transducers referred to may be any type measuring device, appropriate for the purpose. For example, the digital level transducer can be a shaft encoder, linear encoder, or other like device. The digital footage transducer may be footage wheel with a photoelectric pickup or a similar device.

The means for applying the coating material to the substrate may vary in type and structure in considerable detail and the means for feeding the substrate and for feeding the liquid to it may also vary. Only preferred embodiments of the invention have been shown and described herein and numerous modifications or alterations may be made to the specific structures described without departing from the spirit and scope of the invention as set forth in the appended claims.

What is claimed is:

1. In a coating computer for determining the amount of coating material applied to an advancing strip per unit areas of said strip for use with apparatus for coating said strip wherein said coating apparatus has means means for advancing said strip and conduit means for transferring coating material therethrough from a supply source to an applicator means for applying said coating material to said strip, said coating computer comprising, in combination, a buffer tank included in said conduit means for holding a quantity of said coating material in said conduit means, control means connected with said conduit means operative to prevent said coating material in said conduit from being transferred into said buffer tank during a period in which said coating apparatus continues to apply said coating material to said advancing strip, digital level transducer means for determining the difference between the quantity of coating material in said buffer tank at the beginning and at the end of said period, digital footage transducer means for determining the area of said strip that is coated during said period, and said digital level transducer means including means to actuate said digital footage transducer at the beginning of said period, whereby said difference in the quantity of coating material can be compared with the area of said strip that is coated during said period to determine the amount of coating material applied to said strip per unit area of said strip.

2. Apparatus described in claim 1 wherein said digital footage transducer is programmed to indicate when a given area of strip has been coated and said digital level transducer having a readout proportioned to said given area of strip for indicating in proper engineering units the amount of coating material applied per unit area of said strip.

3. Apparatus for determining the amount of coating material applied to an advancing strip per unit area of said strip as described in claim 1 wherein said digital level transducer has first and second sensors each attached to said buffer tank at a different level, said first sensor being attached to said tank at a higher level than said second, said sensors being adapted to indicate when a given amount of coating material has been applied, said digit footage transducer has a readout to indicate the area of strip coated, and wherein said first sensor actuates said digital footage transducer to begin said period and said second sensor deactivates said digital footage transducer to terminate said period, whereby the given amount of coating material applied to said strip can be divided by the appropriate area indicated by said readouts to determine the amount of coating material applied to said strip per unit area of said strip.

4. Apparatus as described in claim 1 wherein said buffer tank has a main tank section and an upper section separated from the main tank section by a rolling diaphragm, and wherein said digital level transducer is associated with said upper tank section.

5. Apparatus as defined in claim 4 wherein said coating material is liquid and wherein said upper tank section contains a liquid other than said liquid coating material which is coated on said strip.

6. A coating computer for determining the amount of liquid applied to an advancing strip per unit area of said strip for use with apparatus having means for advancing said strip, a liquid-supply reservoir adjacent said strip to maintain a supply of said liquid for transfer to said advancing strip, means, including applicator means, operatively connected with said reservoir for transferring said liquid from said reservoir thereby to coat said advancing strip, and conduit means connected to a supply source of said coating liquid and to said liquid-supply reservoir for passing said liquid from said supply source to said liquid supply tank, said coating computer comprising, in combination, a metering tank in said conduit means for holding a quantity of said liquid to be transferred by said conduit means, selectively actuable means for preventing said liquid from passing into said metering tank, means for maintaining a constant quantity of said liquid in said liquid-supply reservoir during the coating operation, digital level transducer means to determine the difference between the quantity of liquid in said metering tank at the beginning and at the end of a period when said liquid is prevented from entering said metering tank, digital footage transducer means for determining the area of said strip that is coated during said period and said digital level transducer means including means to actuate said digital footage transducer means at the beginning of said period, whereby said difference can be compared with the area of strip coated during said period to determine thereby the amount of liquid applied to said advancing strip per unit area of said strip.

7. Apparatus as described in claim 6 wherein said means for preventing said liquid from passing into said metering tank is an electrically-operated, normally-open valve in said conduit means.

8. Apparatus as described in claim 6 wherein said means for maintaining a constant quantity of said liquid in said liquid-supply reservoir includes a weir provided in said reservoir and means to return liquid overflowing said weir to said metering tank.

9. Apparatus as described in claim 6 wherein said means for maintaining a constant quantity of said liquid in said liquid-supply reservoir includes an overflow pipe in said reservoir and means to return liquid entering said overflow pipe to said metering tank.

10. Apparatus as described in claim 6 wherein said means for maintaining a constant quantity of said liquid in said liquid-supply reservoir is a float controlled valve connected in said conduit means which is modulated by a float in said liquid supply reservoir.

11. Apparatus as described in claim 8 wherein said liquid-supply reservoir is oriented above said metering tank, said liquid is pumped through said conduit from said metering tank to said liquid-supply tank by an adjustable speed pump and said means to return said liquid overflowing said weir is a line adapted to return said liquid by gravity.

12. Apparatus as described in claim 10 wherein said metering tank is oriented above said liquid supply reservoir and said liquid flows through said conduit from said metering tank to said liquid-supply reservoir by gravity, said conduit having a valve to control the rate of said flow, and said means to return liquid overflowing said weir is a line having an adjustable speed pump operatively connected therewith to pump said overflowing liquid back to said metering tank.

References Cited

UNITED STATES PATENTS

| | | | |
|---|---|---|---|
| 3,172,779 | 3/1965 | Warshaw et al. | 118—9 |
| 3,371,318 | 2/1968 | Claiborne et al. | 340—172.5 |
| 3,378,676 | 4/1968 | Clement | 118—9X |
| 3,387,282 | 6/1968 | Jacques | 340—172.5 |
| 3,510,374 | 5/1970 | Walker | 118—9X |
| 3,515,094 | 6/1970 | McVey | 118—9X |

MORRIS KAPLAN, Primary Examiner

U.S. Cl. X.R.

118—9, 10, 429